United States Patent [19]

Vu

[11] Patent Number: 5,803,507

[45] Date of Patent: Sep. 8, 1998

[54] APPARATUS FOR HANDLING PROCESS FLUID

[75] Inventor: Kim N. Vu, Yorba Linda, Calif.

[73] Assignee: Unit Instruments, Inc., Yorba Linda, Calif.

[21] Appl. No.: 557,378

[22] Filed: Nov. 13, 1995

Related U.S. Application Data

[63] Continuation of Ser. No. 469,785, Jun. 6, 1995, abandoned, which is a continuation of Ser. No. 355,120, Dec. 13, 1994, abandoned, which is a continuation of Ser. No. 132,764, Oct. 6, 1993, abandoned.

[51] Int. Cl.⁶ ........................................................... F16L 55/00
[52] U.S. Cl. ............................ 285/23; 285/328; 285/336; 285/917
[58] Field of Search ...................................... 285/328, 336, 285/917, 23

[56] References Cited

U.S. PATENT DOCUMENTS

| | | |
|---|---|---|
| 850,230 | 4/1907 | Kiehle . |
| 1,133,320 | 3/1915 | Rockwood . |

(List continued on next page.)

FOREIGN PATENT DOCUMENTS

| | | | |
|---|---|---|---|
| 0 392 072 | 10/1990 | European Pat. Off. . | |
| 6800 | 3/1907 | France . | |
| 2 619 599 | 2/1989 | France . | |
| 716079 | 1/1942 | Germany | 285/336 |
| 24 52 945 | 5/1975 | Germany . | |
| 516867 | 6/1976 | U.S.S.R. | 285/917 |
| 870230 | 6/1961 | United Kingdom . | |
| 942447 | 11/1963 | United Kingdom | 285/917 |
| 1161444 | 8/1969 | United Kingdom . | |

OTHER PUBLICATIONS

Communication dated Oct. 18, 1996 from European Patent Office for European Application No. 94930532.0 corresponding to the instant United States application.

International Search Report, International Application No. PCT/US94/11103, filed Sep. 30, 1994, corresponding to the instant application.

PCT Written Opinion dated Jul. 17, 1995, International Application No. PCT/US94/11103, filed Sep. 30, 1994 corresponding to the instant application.

Metal "H" Seal System for High Integrity Vacuum Sealing, Bostec Engineering, 1992.

Maissel and Glang, eds. Handbook of Thin Film Technology, pp. 2–77 thru 2–85, 1970.

EVAC Catalog, "Quick Release Flange Couplings Using Clamp Chains, NW 63. . . 630, Components for Tubes ISO", Edition, Jul. 1989.

EVAC Catalog, "Quick Release Flange Couplings Using Clamp Chains, NW 10. . . 63, Components PNEUROP KF", Edition Jul. 1989.

Osaka Vacuum, Ltd. Brochure, Magnetic Suspended Compound Molecular Pumps TG–M Series, 1990.

Vacuum Parts Supply, "Vacuum Components Catalog", 59 paes, 1991.

"Clamping Flange Fittings" and UHV Clamping Flanges Specification Sheets, 2 pages, undated.

EVAC Product Brochure, "Quick Release Flange Couplings for UHV Technology", undated.

Hoke Brochure, "Trifold Needle Valve Manifold Flange by Flange", page, undated.

Instrumentation Connectors Division Brochure, "UltraSeal Components", 3 pages undated.

An Introduction to Hy–Techn Fittings The Interchangeable Solution, 4 pages undated.

(List continued on next page.)

*Primary Examiner*—Dave W. Arola
*Attorney, Agent, or Firm*—Fitch, Even, Tabin & Flannery

[57] ABSTRACT

Apparatus for handling process fluid, that is a meter includes a mass flow meter block. A deformable metal seal is positioned between the mass flow meter block and a thermal mass flow sensor in deformable engagement with a pair of edges formed thereon to provide a low contamination, high integrity metal seal.

11 Claims, 3 Drawing Sheets

U.S. PATENT DOCUMENTS

| | | |
|---|---|---|
| 1,834,581 | 12/1931 | Ferrell et al. . |
| 1,848,307 | 3/1932 | Boynton . |
| 2,307,440 | 1/1943 | Wilson ................................. 288/23 |
| 2,528,665 | 11/1950 | Peterson et al. ........................ 309/2 |
| 2,594,618 | 4/1952 | Booth, Jr. ............................. 72/204 |
| 2,611,506 | 9/1952 | Scheer ................................. 220/46 |
| 2,750,797 | 6/1956 | Hirst ................................... 73/202 |
| 2,922,666 | 1/1960 | Lange et al. ..................... 285/917 X |
| 2,926,937 | 3/1960 | Parsons ........................... 285/917 X |
| 3,201,725 | 8/1965 | Johnson ................................ 333/98 |
| 3,373,998 | 3/1968 | Bialkowski ........................... 277/110 |
| 3,521,910 | 7/1970 | Callahan, Jr., et al. ............... 285/14 |
| 3,572,366 | 3/1971 | Wiggins .............................. 137/240 |
| 3,606,361 | 9/1971 | Pohl et al. ........................ 277/235 B |
| 3,847,420 | 11/1974 | Seville .................................. 285/336 |
| 3,888,496 | 6/1975 | Dryer ............................... 285/336 X |
| 3,915,194 | 10/1975 | Friedrick .............................. 137/608 |
| 4,030,357 | 6/1977 | Wemyss ................................. 73/202 |
| 4,151,745 | 5/1979 | Cordy et al. ............................. 73/201 |
| 4,196,913 | 4/1980 | Oka .................................. 277/235 B |
| 4,203,554 | 5/1980 | Zimmer et al. ...................... 239/585 |
| 4,232,549 | 11/1980 | Migrin et al. .......................... 73/202 |
| 4,303,251 | 12/1981 | Harra et al. .......................... 277/236 |
| 4,381,668 | 5/1983 | Sato et al. ............................. 73/202 |
| 4,433,575 | 2/1984 | Rutherford ............................ 73/202 |
| 4,440,021 | 4/1984 | Abouchar ............................. 73/204 |
| 4,478,617 | 10/1984 | Rees ................................... 55/314 |
| 4,516,784 | 5/1985 | Merz .................................. 277/180 |
| 4,517,838 | 5/1985 | Wachi et al. ........................... 73/204 |
| 4,569,504 | 2/1986 | Doyle .............................. 251/129.15 |
| 4,616,860 | 10/1986 | Faria et al. ............................ 285/336 |
| 4,625,978 | 12/1986 | Jelinek ................................ 277/180 |
| 4,650,227 | 3/1987 | Babuder et al. ........................ 285/379 |
| 4,665,960 | 5/1987 | Brzezicki et al. ...................... 141/384 |
| 4,672,997 | 6/1987 | Landis et al. ......................... 137/554 |
| 4,681,329 | 7/1987 | Contin .............................. 277/167.5 |
| 4,686,856 | 8/1987 | Vavra et al. ............................ 73/204 |
| 4,687,020 | 8/1987 | Doyle ................................. 137/486 |
| 4,695,034 | 9/1987 | Shimizu et al. ................... 251/129.06 |
| 4,858,643 | 8/1989 | Vavra et al. .......................... 137/486 |
| 4,867,118 | 9/1989 | Kubis et al. ........................... 123/193 |
| 4,913,192 | 4/1990 | Vavra ................................. 137/889 |
| 4,928,048 | 5/1990 | Doyle ................................. 318/644 |
| 4,950,002 | 8/1990 | Hormansdorfer .................. 285/917 X |
| 5,135,269 | 8/1992 | Babuda ............................. 285/917 X |
| 5,303,731 | 4/1994 | Vavra et al. ........................... 137/468 |
| 5,366,261 | 11/1994 | Ohmi et al. ....................... 285/917 X |

OTHER PUBLICATIONS

B. Blanc, R.P. Henry and J. LeClerc, "Technolgie de L'Étanchété", *Le vide les couche minces*, vol. 34, Sep. and Oct. 1979, No. 198, Paris, pp. 316–337.

Notification of Transmittal of International Search Report Mailed Nov. 30, 1994 for International application No. PCT/US94/11103.

International Publication No. WO 90/12239 (International Application No. PCT/US90/02019, corresponding to U.S. Serial No. 509,015), published Oct. 18, 1990.

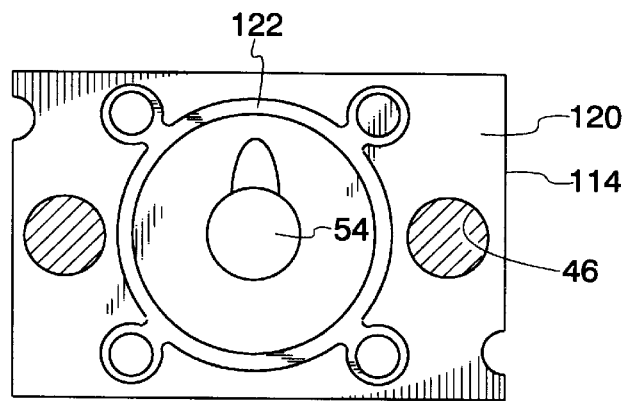
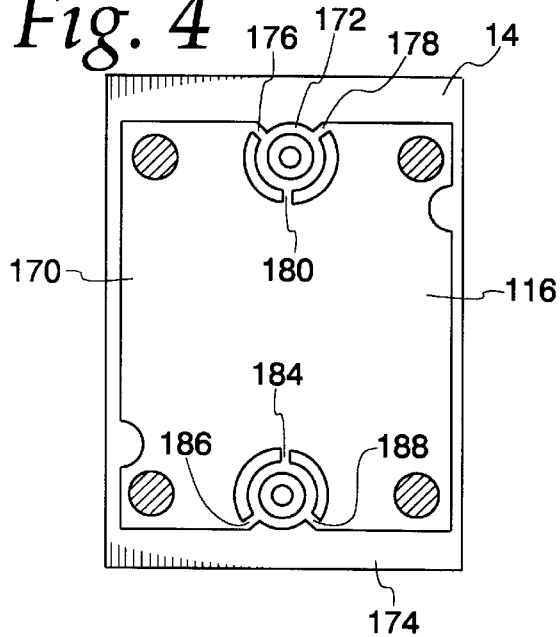
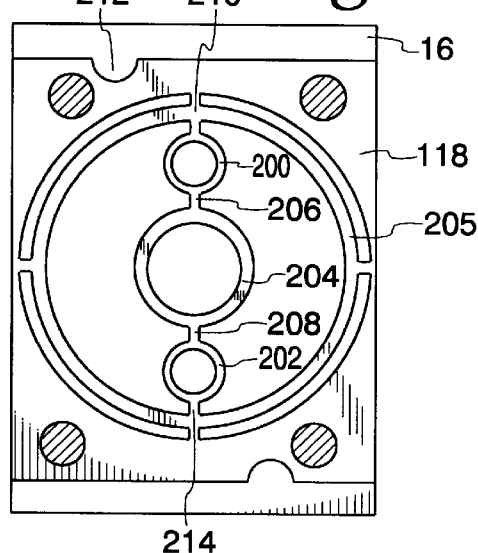
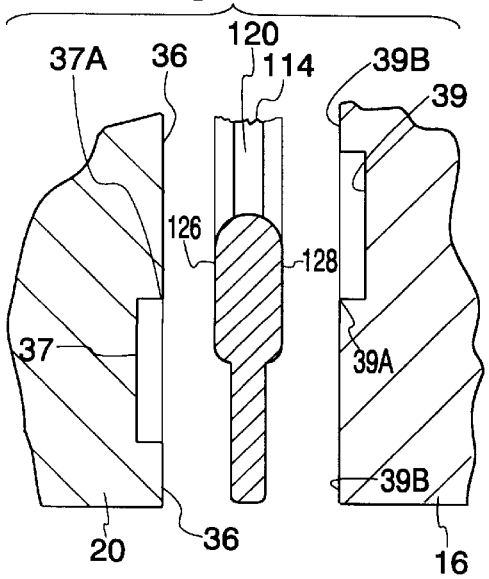
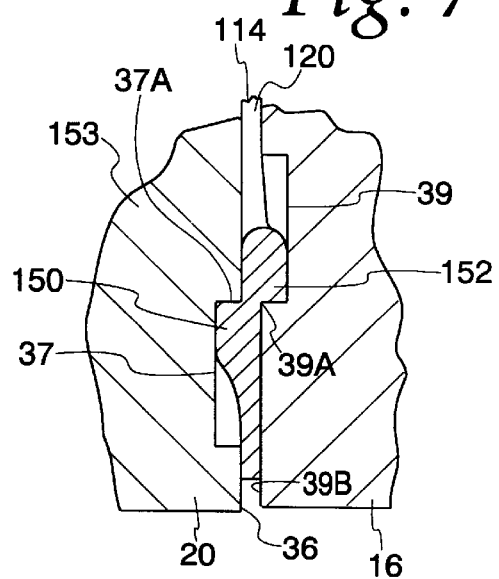

APPARATUS FOR HANDLING PROCESS FLUID

This application is a continuation of application Ser. No. 469,785, filed Jun. 6, 1995, which is a continuation of Ser. No. 08/355,120, filed Dec. 13, 1994 which is a continuation of application Ser. No. 08/132,764, filed Oct. 6, 1993, all now abandoned.

BACKGROUND OF THE INVENTION

The invention relates in general to apparatus for handling process such as a flow meter having an improved metal seal between two of its components. In particular, the invention relates to a thermal mass flow meter having a metal seal which allows excellent dimensional control over the assembled dimensions of the mass flow meter while maintaining good sealing and low contamination of a gas stream flowing through the mass flow meter.

It is well known in the art of designing and manufacturing mass flow meters and mass flow controllers, in particular mass flow controllers having thermal mass flow meters connected with electromagnetic valves, to assemble the components of the mass flow controller, including inlets, mass flow meter blocks valve blocks, outlets, and the like, with elastomeric or other nonmetallic O-ring fittings forming seals therebetween. Such thermal mass flow controllers are often used to meter precisely the flow of a gas or vapor in the manufacture of semiconductor devices. For instance, semiconductor wafers are fabricated by a number of processes including chemical vapor deposition, thermal oxidation, plasma etching, and vacuum sputtering. Gases and/or vapors used in such wafer fabrication processes include hydrogen, oxygen, silane, dichlorosilane, sulphur hexafluoride, tetraethoxysilane, argon and nitrogen. It is also well known that the design rules for integrated circuits continue to shrink and are now approaching one-quarter micron. As the dimensions of the individual components formed on the semiconductor dies shrink, the likelihood increases that even very small amounts of particulates may so contaminate the process gas stream as to render the semiconductor dies unusable.

In an earlier effort to reduce the number of particulates that may be generated by mass flow controllers having conventional O-ring seals, the inventors have previously developed a modular thermal mass flow controller having bead type metal seals that is disclosed in International Publication No. WO 90/12239 (International Application No. PCT/US90/02019). That modular thermal mass flow controller has separate mass flow meter and valve blocks that terminate in face seals. The blocks are held together by screws. Separate inlet and outlet fittings are attached to the face seals, the fittings being adapted to form a first portion of a Cajon fitting. The rounded metal or bead type seal formed integrally with flat faces not only allows a modular mass flow controller to be constructed easily from a variety of components, but also avoids having to use intermediate Cajon fittings that would increase the size or footprint of the mass flow controller.

Unfortunately, the prior bead type metal seal suffers from the drawback that it requires a relatively large force to bring it into good sealing engagement because the substantially circular cross section of the bead type seal has high crush strength. Since the bead is being engaged by flat faces of the mass flow controller component blocks, the assembly often may be uncertain how much the bead must be compressed in order to obtain good sealing between the blocks.

What is needed is an improved metal seal which allows easy closure with a low applied force and assembly while providing excellent sealing characteristics and little or no particulate contamination of the process gas stream flowing through the thermal mass flow controller.

SUMMARY OF THE INVENTION

The present invention is embodied in an apparatus for handling process fluid, more specifically, a modular thermal mass flow controller incorporating low closing force, low contamination metal seals between components thereof. The apparatus includes a block having a sealing groove formed on a face thereof, the sealing groove terminating in an edge. A removable connection fitting is connected to the sealing groove in fluid communication therewith. The connection fitting has a sealing groove formed on a face. The sealing groove extends around an axis and is defined by a radial distance slightly different than the radial distance of the groove on the block. The removable connection groove also terminates in an edge. A deformable metal seal is positioned between the removable connection and the block so that as the removable connection and the block are assembled, the faces are moved toward each other and offset edges engage the seal. The pressure applied by the edges forces the seal into a configuration having a pair of relatively wide end portions and a relatively narrow middle portion.

The instant invention provides cost savings by reduction of seal thicknesses from 0.060 inch to 0.031 inch, using sheet stock rather than bar stock for production of seals. Since the seal is chemically machined and not machined, it may be etched in multiple units and may also be heat treated, cleaned and packaged in multiple units. A keeper assembly associated with the seal provides a self-locating feature so that the seal may be quickly and easily assembled. The high pressure applied by the edges upon the deformable metal seal yields a 60% reduction in the tightening torque required to effect adequate closure of the components allowing the apparatus to be assembled without the use of a clamping fixture. Furthermore, the wide range of deformability of the seal, while maintaining good contact, allows for large tolerances in the mating surface finishes of the seal, the edges and the associated surfaces of the block and removable connecting being brought into contact with each other. The likelihood of internal seal wall breakdown of the type which may occur in a metal O-ring design and which yields slow contaminating out-gassing of the internal O-ring volume into the process stream is greatly reduced. Although the seal itself may be disposed of when the components are disassembled for maintenance and the like, the relatively hard surfaces of the block and removable connection are not damaged by repeated closures with the soft seals and high sealing integrity is thereby preserved.

It is a principal aspect of the present invention to provide an apparatus for handling process fluid, including an improved metal seal which provides very little in the way of contaminants to the process gas being handled.

It is another aspect of the present invention to provide apparatus for handling process fluid which is low cost and quickly and easily assembled.

Other aspects of the invention will become obvious to one or ordinary skill in the art upon a perusal of the following specification and claims in light of the accompanying drawings.

BRIEF DESCRIPTION OF THE DRAWINGS

FIG. 3 is an elevational view of a first metal integrated keeper-seal embodying the present invention and adapted to be positioned between a thermal mass flow meter block and a valve block of the thermal mass flow controller sewn in FIG. 1;

FIG. 4 is an elevational view of a second metal integrated keeper-seal embodying the present invention and adapted to be positioned between a sensor tube mounting block and the thermal mass flow meter block of the thermal mass flow controller shown in FIG. 1;

FIG. 5 is an elevational view of a third metal integrated keeper-seal embodying the present invention and adapted to be positioned between the valve block and an electromagnetic valve of the thermal mass flow controller shown in FIG. 1;

FIG. 6 is an enlarged sectional view, having portions broken away to show details thereof, of a part of the first integrated metal keeper-seal shown in FIG. 3 prior to engagement by the thermal mass flow meter block and the valve block; and FIG. 7 is an enlarged sectional view, having portions broken away to show details thereof, of the first metal seal shown in FIG. 6 after it has been engaged by the thermal mass flow meter block and the valve block and forming a good seal therebetween.

DETAILED DESCRIPTION OF THE PREFERRED EMBODIMENT

Figure 1:
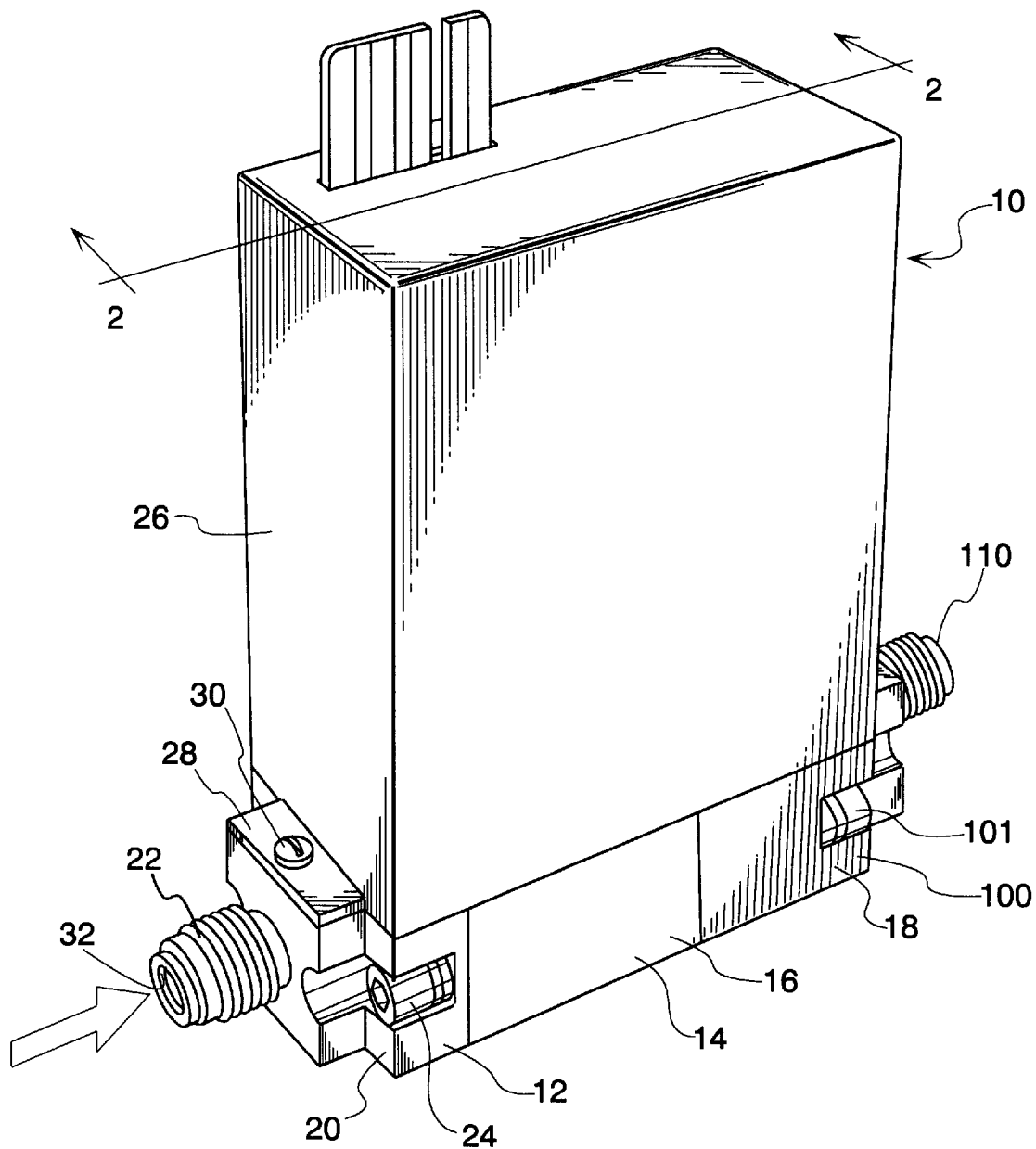
FIG. 1 is a perspective view of a normal flow thermal mass flow controller having a thermal mass flow meter embodying the present invention.

Referring now to the drawings, and especially to FIG. 1, apparatus for handling process fluid comprising a modular thermal mass flow controller embodying the present invention and generally identified by reference numeral 10 is shown therein. The modular thermal mass flow controller 10 includes an inlet 12 for receiving a flow of gas to be metered. A thermal mass flow meter 14 which is also a removable connection fitting for producing a signal related to a mass flow rate of a gas or vapor, for instance a process gas such as hydrogen, oxygen, silane, dichlorosilane, sulphur hexafluoride, tetraethoxysilane, argon and nitrogen, is connected to the inlet 12 to receive the flow of gas from it. The thermal mass flow meter 14 has a thermal mass flow meter block 16 in communication with the inlet 12. A valve assembly 18 is connected to the thermal mass flow meter 14 at the thermal mass flow block 16 to control the rate of flow of gas in response to the thermal mass flow meter 14.

The inlet 12 includes an inlet block 20 having an integrally formed threaded fitting 22 of the type adapted to connect to a Cajon or VCR fitting to receive gas from a suitable source such as a tank or a portion of a gas shelf. The inlet block 20 is connected to the thermal mass flow meter 14 via a pair of bolts, one of which is shown as the bolt 24. A cover 26 has a cover tab 28 that receives a screw 30 for holding the cover 26 to the inlet block 20. The inlet block 20 has a circular gas inlet port 32 to which is connected a gas inlet bore 34 formed therein that has a substantially circular cross section and receives the process gas stream to be metered. That process gas stream exits the inlet block 20 through a circular face exit port 35 formed in a flat face 36. A rectangular cross section sealing groove 37 having a right angle sealing edge 37a is formed around the port 35.

A circular mass flow meter inlet port 38 is positioned in registration with the exit port 36 to receive the stream of gas. A rectangular cross section sealing groove 39 having a sealing edge 39a is formed on a face 39b. The rectangular cross section sealing groove 39 has a slightly smaller diameter than the sealing groove 37. A bypass bore 40 formed in the thermal mass flow meter block 16 is connected to the mass flow meter inlet port 38 to receive and carry the stream of gas. A pressure dropping flow restricter or bypass 42, consisting of a plurality of tubes 44, rests within the bypass bore 40 to provide a pressure drop across the thermal mass flow meter block 14 and to drive a sensor portion of the stream of gas through a sensor tube of the thermal mass flow meter 14. The thermal mass flow meter 14 includes a signal processing circuit 46 for energizing thermally responsive windings in contact with the sensor tube and producing the flow signal.

A thermal mass flow sensor 62 for generating a first unconditioned flow signal is connected to the thermal mass flow meter block 16 to receive a portion of the flow of gas therefrom. The thermal mass flow sensor 62 includes a sensor base 64 connected to the block 16 to receive the flow of gas therefrom. The sensor tube 68 is in this embodiment a 316L stainless steel sensor tube 68 that is of conventional construction in the thermal mass flow meter art. The sensor tube 68 receives a portion of the flow of gas from the thermal mass flow meter block 16. The sensor tube 68 has an inlet leg 70 connected to the sensor inlet bore 71 of the mass flow meter block 16 to receive a sensor portion of the stream of gas therefrom, a transverse or sensor leg 72 is formed integrally with the inlet leg 70 and receives the sensor portion of the stream of gas from the inlet leg 70. An outlet leg 74 is formed integrally with the transverse leg 72 and receives the sensor stream therefrom. The sensor portion of the flow of gas is forced through the sensor tube 68 by the pressure drop across the bypass 42.

The circuit board 48 is mounted behind the sensor tube 68. A pair of serially connected 1.5 mil electrical windings 76 and 78 having a high coefficient of thermal resistivity is wound around the transverse leg 72 of the sensor tube 68 in good heat transfer relation as is well known to those skilled in the art. A thermal strap 80, in this embodiment comprising a copper wire, is connected at a first connection point comprising an upstream winding 82 to the inlet leg 70 by soldering or silver epoxy or other good thermal conductor. An opposite end of the thermal strap 80 comprises a second point 84 that is connected in good heat transfer with the outlet leg 74 of the sensor tube 68. The thermal strap 80 both balances the thermal response and speeds up the thermal response of the sensor tube 68. An insulating blanket 86 is wrapped around the transverse leg 72 and the serially connected windings 76 and 78 to minimize the effect on the sensor response to the flow of gas of unwanted heat transfer out of the transverse leg 72. When the windings 76 and 78 are electrically energized by electric current from the signal processing circuit 46 they provide a flow signal through a wiring harness 89 to the signal processing circuit 46 connected thereto.

The flow signal is received by the signal processing circuit board 46 and transmitted to and from an edge connector 88 of the circuit board 48 extending through the top of the cover 26.

The valve assembly 18 has an electromagnetic valve 92 connected to the circuit board 46 to be driven therefrom in response to the flow signal. In particular, the electromagnetic valve 92 includes a solenoid 94 that drives a plunger 96 toward and away from a jet 98 to control the flow of gas or vapor through the thermal mass flow controller 10.

A valve block 100 is likewise connected by a pair of threaded connectors, one of which is shown as connector 101, to the mass flow meter block 16. Both threaded connectors 30 and 46 are adapted to receive an Allen wrench in order that they may be tightened into engagement with the mass flow meter block 16.

A valve inlet bore 102 that receives the flow of gas from the mass flow meter block 16 and carries it to an inlet 104 of the electromagnetic valve 92. An outlet 106 is connected to the valve jet 96 to receive the flow of gas from the electromagnetic valve 92 and transmitting it to a substantially circular outlet bore 108 extending through an integral outlet Cajon fitting 110 having a threaded outer wall 112 formed thereon.

Metal seals are provided respectively between the inlet block 20 and the mass flow meter block 16, between the mass flow meter block 16 and the valve block 100, between the mass flow meter block 16 and the sensor 62, and between the valve block 100 and the electromagnetic valve 96. As is shown in FIGS. 3, 4, and 5, which show integrated keeper-seals 114, 116 and 118 in the form they take prior to assembly, the integrated keeper-seal 114 is of the type which is positioned between the pairs of the blocks 20, 16 and 100. The integrated keeper-seal 116 shown in FIG. 4 is of the type positioned between the mass flow meter block 16 and the sensor 62. The integrated keeper-seal 118 shown in FIG. 5 is of the type used to effect sealing joinder between the valve block 100 and the electromagnetic valve 92.

The integrated keeper-seal 114 includes a keeper portion 120 and a rounded seal portion 122. The integrated keeper-seal 114 is formed by chemical etching with the keeper portion 120 being etched to a thickness of 0.026 inch and the rounded seal portion 122 being etched to a thickness of 0.031 inch. The rounded seal portion 122 shown in FIG. 6 has a rounded rectangular cross section and a pair of substantially parallel opposing faces 126 and 128. The integrated keeper-seals 114, 116 and 118, are comprised of fully annealed nickel 200 having a Rockwell hardness of 35 to 45 $R_B$. No surface finish is required on the rounded seal portion 122 or on any other portion of the integrated keeper-seals 114, 116 and 118.

When the inlet block 20 having the face 36 is brought into proximity with the mass flow meter block 16 having the face 39b, as shown in FIGS. 6 and 7, the rectangular cross section sealing groove 37 in the inlet block 20 is brought into offset proximity with the rectangular cross section sealing groove 39b of the mass flow meter block 16. Note that the rectangular cross section grooves 37a and 39b, however, are offset so that the sealing right angle edge 37a and the right angle edge 39a are aligned and brought into shearing engagement respectively with faces 126 and 128 of the rounded seal 122. The pressure exerted by the faces 126 and 128 upon the seal 110 compresses and deforms the rounded seal 122 into a dumbbell-shaped cross section having a first widened end 150, and a second widened end 152 and a narrow center portion 153. Only 60% of the closure force for bead type seals is required because the inventive seal is, in essence, two edges which are contacting the rounded seal 122. In addition, because of the very high local pressures applied by the edges 37a and 39a to the rounded seal 122, no surface finish is required to prepare the rounded seal 122 prior to closure, as would be needed for the bead-type seal of the prior art.

Referring now to the integrated keeper-seal 116 shown in FIG. 4, the integrated keeper-seal 116 comprises a 0.026 inch thick keeper plate 170 to be engaged by the threaded fasteners during assembly so that a pair of sensor circular seals 172 and 174 is in proper registration. The sensor circular seals 172 and 174 are connected to the keeper plate 170 by respective webs 176, 178, and 180, as well as webs 184, 186, and 188. Each of the circular seals 172 and 174 is 0.031 inch thick and has a rounded rectangular cross section.

Figure 2:
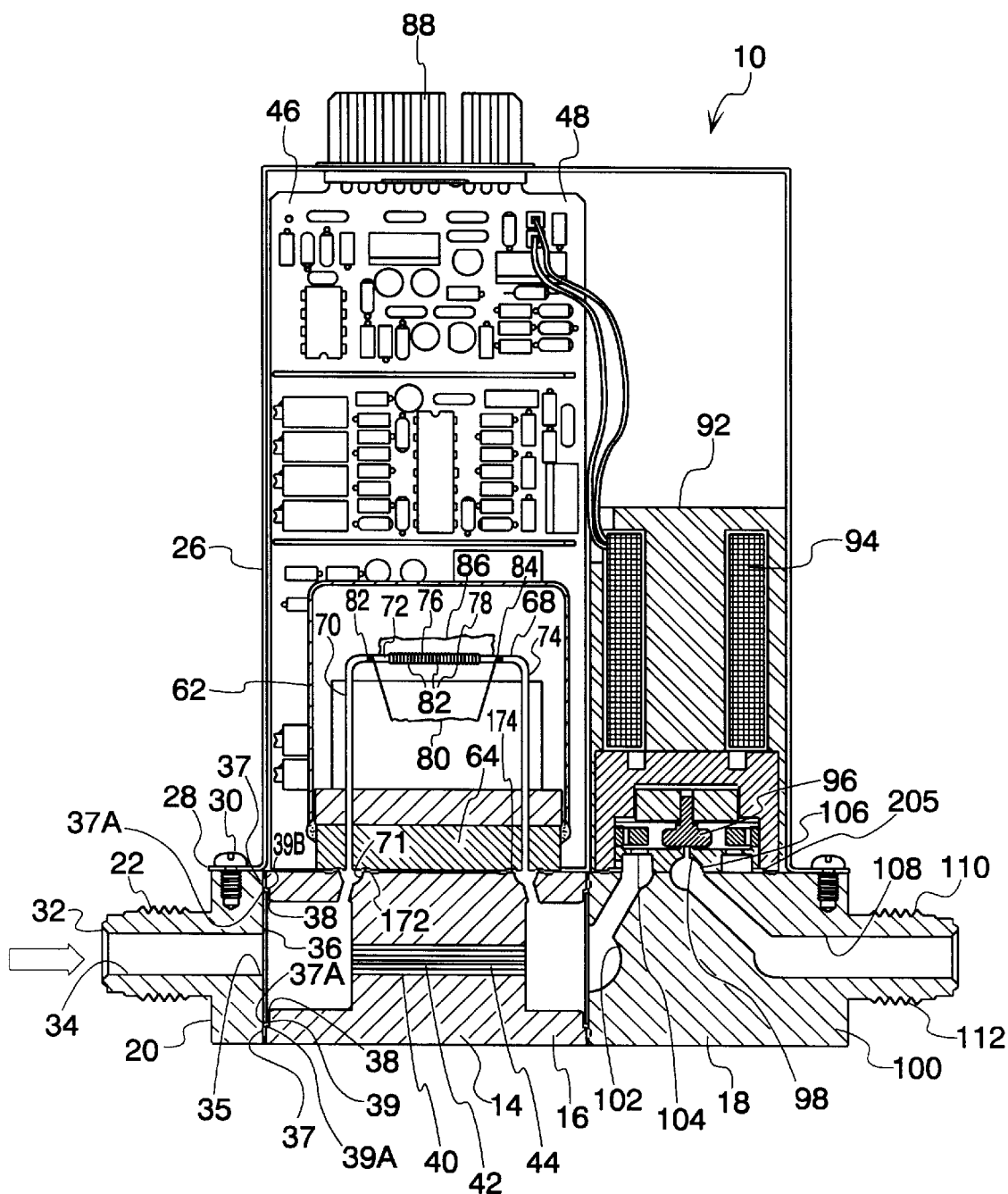
FIG. 2 is a sectional view of the thermal mass flow controller shown in FIG. 1 taken along line 2—2 of FIG. 1.

Similarly, the integrated keeper-seal 118 shown in FIG. 5 includes seal rings 200, 202, 204 and 205 each having rounded rectangular cross sections and a thickness of 0.031 inch. Only one of the seal rings 200 or 202 is adapted to match with the inlet 56 of the electromagnetic valve 100. The other seal ring is a spare to allow a symmetric keeper to be used. The seal ring 204 provides a seal immediately underneath the valve jet 98. The seal ring 205 may also be seen in FIG. 2.

The seals 172, 174, 200, 202, and 204 are likewise held between knife edges integral with the closing faces, causing a dumbbell-shaped, deformed seal to be formed therein with relatively low closing force without the introduction of contaminants or the need for surface finishing on the seals themselves.

The seal rings 200 and 202 are connected to the seal ring 204 via respective webs 206 and 208. A web 210 connects the seal ring 200 to a plate 212 of the keeper assembly 104. A web 214 connects the seal ring 202 to the keeper assembly 212. It may be appreciated that the webs may shear from the seal rings, as is best seen in FIG. 7, as the seal is being completed when the modular thermal mass flow controller 10 is assembled. Such web shearing, however, does not result in any reduction of the integrity of the seal and whether the shearing takes place or not is immaterial to the high integrity of the seal thus being formed.

It may be appreciated that the low cost, low contamination, easily produced mass flow controller having a metal seal may be used in very clean environments for the production of semiconductors.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. Apparatus for handling process fluid, comprising:
   a metal block having a block sealing groove formed on a flat face thereof and terminating in a block sealing edge formed substantially flush with the flat face;
   a metal removable connection fitting connected to the metal block in fluid communication therewith, the metal removable connection fitting having a connection sealing groove formed on a flat face thereof, the connection sealing groove terminating in an offset, relative to said block sealing edge, connection sealing edge formed substantially flush with the flat face, the metal block and the metal removable connection fitting defining an internal flow path;
   a removable metal seal having an inner circumferential edge, an outer circumferential edge and a pair of flat faces and being positioned between the metal removable connection fitting and the metal block so that as the removable connection fitting and the metal block are assembled, the flat faces are moved toward each other and the offset block sealing edge and connection sealing edge engage said removable metal seal deforming said removable metal seal into a configuration having a pair of relatively wide end portions and relatively narrow middle portion with a seal being effected at the offset block sealing edge and connection sealing edge, the inner circumferential edge and the outer circumferential edge being substantially free of contact with the metal block and the metal removable connection fitting and the inner circumferential edge being in communication with the flow path, the seal being free of virtual leak paths and without the removable metal seal locking the metal block to the metal removable connection fitting; and a locator connected to the seal for positioning the seal with respect to the edges prior to sealing engagement.

2. Apparatus for handling process fluid according to claim 1, wherein the metal block and the metal removable connection fitting are irrotationally positioned with respect to each other during assembly.

3. Apparatus for handling process fluid comprising:

a metal fluid conducting member having a fluid conducting member sealing groove formed on a flat face thereof and terminating in a metal fluid conducting member edge formed substantially flush with the flat face extending on each side of a block sealing groove;

a metal removable connection fitting connected to the metal fluid conducting member in fluid communication therewith, the metal removable connection fitting having a connection sealing groove formed on a flat face thereof, the flat face of the metal removable connection fitting extending on each side of the metal sealing groove, the sealing groove extending around an axis, the connection sealing groove terminating in a metal removable connection fitting edge formed substantially flush with the flat face of the metal removable connection fitting, the metal fluid conducting member and the metal removable connection fitting member defining an internal flow path;

a removable metal seal having an inner circumferential edge, an outer circumferential edge and a pair of flat faces and being positioned between the metal removable connection fitting and the metal fluid conducting member so that as the removable connection fitting and the metal fluid conducting member are assembled, the flat faces are moved toward each other and the metal fluid conduction member edge and the metal removable connection fitting edge engage said removable metal seal, deforming said removable metal seal into a configuration having a pair of relatively wide end portions and a relatively narrow middle portion with a seal being effected at the metal fluid conduction member edge and connection sealing edge, the inner circumferential edge and the outer circumferential edge being substantially free of contact with the metal block and the metal removable connection fitting and the inner circumferential edge being in communication with the flow path, the seal being free of virtual leak paths and without the removable metal seal locking the metal fluid conducting member to the metal removable connection fitting; and a locator connected to the seal for positioning the seal with respect to the edges prior to sealing engagement.

4. Apparatus for handling process fluid according to claim 3, wherein the metal fluid conducting member and the metal removable connection fitting are held without rotation with respect to each other during assembly.

5. Apparatus for handling process fluid, comprising:

a metal fluid conducting member having a fluid conducting member sealing step formed on a flat face thereof and terminating in a metal fluid conducting member edge formed substantially flush with the flat face extending on a side of the fluid conducting member sealing step;

a metal removable connection fitting connected to the metal fluid conducting member in fluid communication therewith, the metal removable connection fitting having a connection sealing step formed on a flat face thereof, the flat face of the metal fitting extending on a side of the metal sealing step, the connection sealing step forming a metal removable connection fitting edge positioned substantially flush with the flat face of the metal fitting, the metal fluid conducting member and the metal removable connection fitting member defining a flow path;

a removable metal seal having an inner circumferential edge, an outer circumferential edge and a pair of flat faces and being positioned between the metal removable connection fitting and the metal fluid conducting member so that as the removable connection fitting and the metal fluid conducting member are assembled, the flat faces are moved toward each other and the metal fluid conducting member edge and the metal removable connection fitting edge engage said removable metal seal deforming said removable metal seal into a configuration having a pair of relatively wide end portions and a relatively narrow middle portion with a seal being effected at the metal fluid conduction member edge and connection sealing edge, the inner circumferential edge and the outer circumferential edge being substantially free of contact with the metal block and the metal removable connection fitting and the inner circumferential edge being in communication with the flow path, the seal being free of virtual leak paths and without the removable metal seal locking the metal fluid conducting member to the metal removable connection fitting; and a locator connected to the seal for positioning the seal with respect to the edges prior to sealing engagement.

6. Apparatus for handling process fluid according to claim 5, wherein the metal fluid conducting member and the metal removable connection fitting are held without rotation with respect to each other during assembly.

7. Apparatus for handling process fluid, comprising:

a first fitting having a first fitting sealing groove formed on a flat face thereof and terminating in a first fitting sealing edge formed substantially flush with the flat face;

a second fitting connected to the first fitting in fluid communication therewith, the second fitting having a second fitting sealing groove formed on a flat face thereof, the second fitting sealing groove terminating in a second fitting sealing edge formed substantially flush with the flat face, the first fitting and the second fitting defining an internal flow path;

a removable flat face seal having an inner circumferential edge, an outer circumferential edge and a pair of flat faces and being positioned between the second fitting and the first fitting so that as first and second fittings are assembled, the flat faces are moved toward each other and the first fitting sealing edge in concert with the second fitting sealing edge engage said removable flat face seal deforming said removable flat face seal into a configuration having a pair of relatively wide end portions and relative narrow middle portion with the seal being effected at the the first fitting sealing edge and second fitting sealing edge; and a keeper connected to the removable seal and coupled to one of the first or second fittings for maintaining the removable seal in good sealing orientation during sealing closure of the first and second fittings.

8. Apparatus for handling process fluid according to claim 7 wherein said first fitting comprises a metal fitting.

9. Apparatus for handling process fluid according to claim 8 wherein said second fitting comprises a metal fitting.

10. Apparatus for handling process according to claim 7 wherein said seal comprises a metal seal.

11. Apparatus for handling process fluid according to claim 7 wherein said keeper comprises a metal keeper.

* * * * *